United States Patent

Nakajima et al.

[11] 4,251,103
[45] Feb. 17, 1981

[54] REAR BODY STRUCTURE OF A VEHICLE

[75] Inventors: Tomoo Nakajima; Shigeyuki Yamaoka; Seiji Tanaka, all of Yokohama, Japan

[73] Assignee: Nissan Motor Company, Limited, Yokohama, Japan

[21] Appl. No.: 74,326

[22] Filed: Sep. 11, 1979

[30] Foreign Application Priority Data

Sep. 21, 1978 [JP] Japan .................... 53-128705[U]

[51] Int. Cl.³ .................................... B62D 25/00
[52] U.S. Cl. .................................... 296/195; 293/102;
D26/28; 362/61; 362/83
[58] Field of Search ........ 293/102, 120, 126, 132–137;
296/195; 362/61, 65, 82, 83; D26/28, 139

[56] References Cited

U.S. PATENT DOCUMENTS

| D. 190,474 | 6/1961 | Nallinger | D26/28 |
| 3,635,517 | 1/1972 | Wilfert | 362/83 X |

FOREIGN PATENT DOCUMENTS

| 1351084 | 12/1963 | France | 296/195 |
| 975220 | 11/1964 | United Kingdom | 296/195 |

Primary Examiner—Robert R. Song
Attorney, Agent, or Firm—Silverman, Cass & Singer, Ltd.

[57] ABSTRACT

A rear body structure of a vehicle including a rear combination lamp whose lateral ends extend on side surfaces of the rear body structure, comprises rear fenders which are depressed forwardly with a depth corresponding to a distance that the lateral ends of the rear combination lamp extend on the side surfaces of the body structure, and a rear end panel being flush with a depressed surfaces of the rear fenders to form a mounting surface for the rear combination lamp, thereby making easy the mounting and sealing of the rear combination lamp whose lateral ends emanate light beams sideways.

5 Claims, 4 Drawing Figures

REAR BODY STRUCTURE OF A VEHICLE

BACKGROUND OF THE INVENTION

1. Field of the Invention

The present invention relates to a rear body structure of a vehicle, and more particularly to a mounting structure for a rear combination lamp which is a combination of direction indicators, reverse lamps, tail lamps and the like, whose lateral ends extend about corners from a rear surface to side surfaces of the rear body structure so that lightening of the lamps can be noticed when viewed at the sides of the vehicle.

2. Description of the Prior Art

Rear combination lamps whose lateral ends extend about corners of rear bodies of vehicles have been known. Such combination lamps have L-shaped ends as viewed in a plan view which are compatible with rear and side surfaces of the vehicles. When the combination lamp is applied to the body from the rear side, a difficultly arises in sealing the side surface although the rear surface is easily sealed, because two directional sealings for the rear and side are necessary.

In order to solve this problem it has been suggested to divide a rear combination lamp into a rear portion and side portions to be separately mounted to the body. This divided combination lamp has, however, a disadvantage in that a relative alignment of these parts of the combination lamp becomes often difficult dependent upon accuracies in forming mounting panels and the parts of the combination lamp.

In order to dispense with the sealing of the side surfaces, it is considered that the combination lamp is integrally formed to have the L-shaped ends, but in the end parts of the combination lamp extending on side surfaces of the body no lamp is arranged, and the sealing and mounting of the combination lamp are effected from rear side of the vehicle. Such a combination lamp solves the problems in sealing and mounting of the combination lamp but does not achieve the effects in safety and design because of the end parts of the combination lamp extending on side surfaces of the body emanating no light beams.

SUMMARY OF THE INVENTION

It is an object of the invention to provide an improved rear body structure of a vehicle which eliminates all the disadvantages of the prior art.

It is another object of the invention to provide a rear body structure of a vehicle capable of easily mounting with good sealing a rear combination lamp whose lateral ends extending on side surfaces of the body emanate light beams.

To accomplish these objects, the rear body structure of a vehicle including a rear combination lamp whose lateral ends extends on side surfaces of the rear body structure, according to the invention comprises rear fenders which are depressed forwardly with a depth corresponding to a distance that the lateral ends of the rear combination lamp extend on the side surfaces of the body structure, and a rear end panel being flush with a depressed surfaces of said rear fenders to form a mounting surface for said rear combination lamp.

The invention will be more fully understood by referring to the following detailed specification and claims taken in connection with the appended drawings.

DETAILED DESCRIPTION OF THE PREFERRED EMBODIMENT

Figure 1:
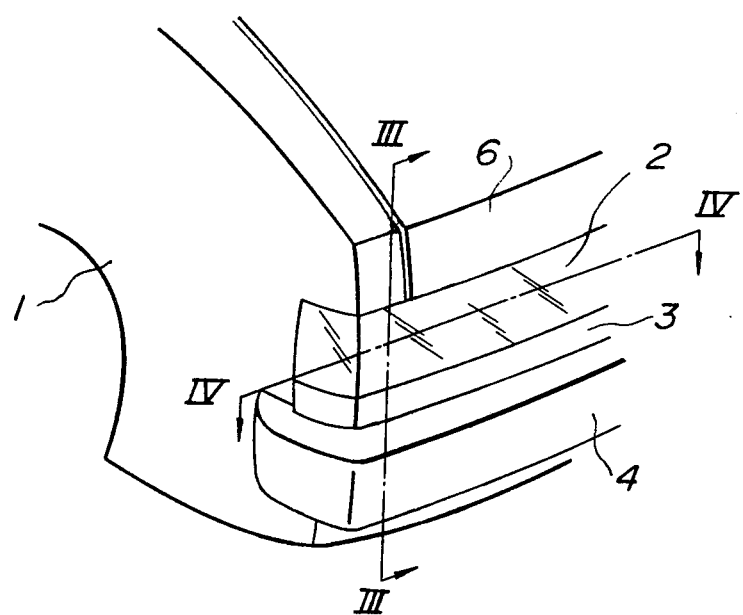
FIG. 1 is a perspective view of the rear body structure of a vehicle according to the invention.

Referring to FIG. 1 illustrating an outline of one side of a rear body structure in the proximity of a rear combination lamp, the rear combination lamp 2 is incorporated in the rear body with each lateral end extending on a side surface of the rear body so as to form a surface which is flush with a rear fender 1 or to form a part of an outer edge of the body, and a sight shield 3 for an ornamentation is provided between the combination lamp 2 and a rear bumper 4 therebelow.

Figure 2:
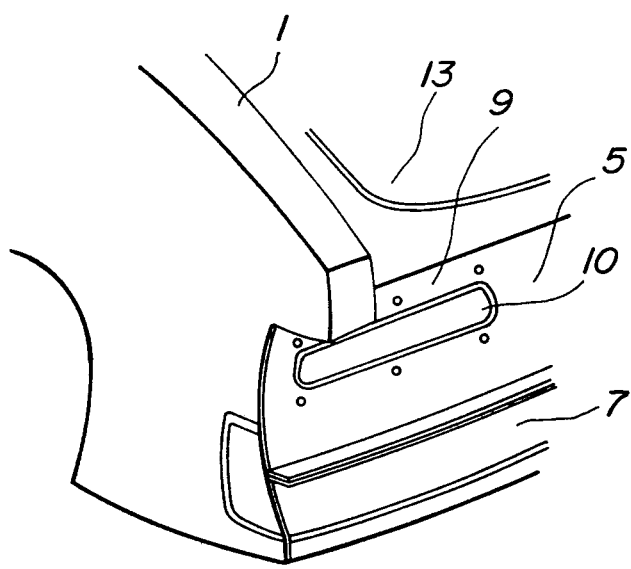
FIG. 2 is a perspective view showing the rear body structure shown in FIG. 1, after the combination lamp, sight shield and bumper have been removed therefrom.
Figure 3:
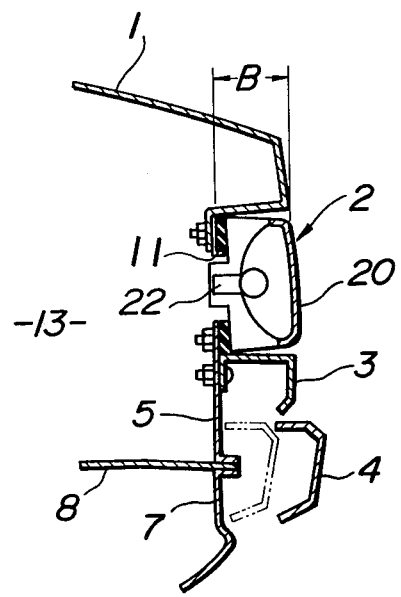
FIG. 3 is a sectional view taken along the line III—III in FIG. 1.
Figure 4:
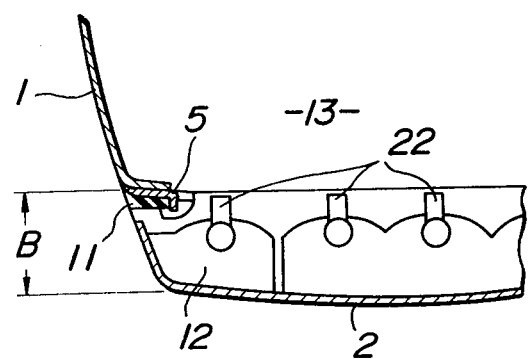
FIG. 4 is a sectional view taken along the line IV—IV in FIG. 1.

FIG. 2 illustrate the rear body structure which has removed the rear combination lamp 2, sight shield 3, rear bumper 4 and a trunk-lid 6 for a trunk from the body shown in FIG. 1. A rear end panel 5 is formed with bores 10 (only one shown in drawing) for mounting the combination lamp 2 and with a lamp mounting surface 9. The rear end panel 5 extends transversely and is spot welded to a lower panel 7 thereunder and the rear fender 1. Edges of the bores 10 and the lamp mounting surface 9 therearound are of smooth flat or curved surfaces so as to be readily and effectively sealed. The lamp mounting surface 9 is located forward at a distance from the rear end of the body corresponding to the width B (FIG. 3) of the combination lamp in a longitudinal direction of the vehicle. As shown in FIGS. 3 and 4, the rear fender 1 is, therefore, greatly depressed with the depth B and the depressed surface is flush with the rear end panel 5. Onto the depressed surface is mounted the combination lamp 2 from the rear side and clamped thereto through packings 11 by means of bolts and nuts. As can be seen from FIGS. 3 and 4, the rear combination lamp 2 comprises a casing 20 to house lamps 22 therein so as not to extend beyond the rear end panel 5 into the trunk 13. The sight shield 3 having a width substantially the same as B is arranged under the combination lamp 2. The bumper 4 is arranged below the sight shield 3 and spaced apart from the rear end panel 5 to an extent enabling the sight shield to conceal a space between the combination lamp 2 and the bumper 4.

The rear body structure constructed as above described according to the invention makes it possible to mount the rear combination lamp 2 only from the rear side to facilitate the assembly of the body structure and makes it possible to apply packings in one direction from the rear side to obtain good sealings. The lateral ends of the rear combination lamp 2 extending on side surfaces of the rear body provide spaces 12 for lamps which illuminate the sides of the vehicle.

As in this embodiment, the lamps 22 are accommodated in the casing 20 so as not to extend beyond rear end panel 5 into the trunk 13, thereby advantageously preventing the lamps and electric wires from being damaged when loading and unloading baggages into and from the trunk.

Moreover, the rear fender 1, rear end panel 5 and lower rear panel 7 are depressed from the rear end of the body, and the sight shield 3 is flush with the rear combination lamp 2, so that a rear floor 8 is shortened by a distance corresponding to the depressed depth of the rear fender 1. Accordingly, short rear floor panels can be used which are common to those for vehicles having short rear floor panels. With this arrangement, furthermore, a sufficient distance can be provided between the bumper 4 and the rear panel 5 to ensure a stroke from the position of the bumper 4 in solid lines to that in phantom lines in FIG. 3 for a shock absorbing bumper, so that the body structure can be applied with either of the normal or shock absorbing bumpers without changing the design of the body structure.

While the invention has been particularly shown and described with reference to a preferred embodiment thereof, it will be understood by those skilled in the art that the foregoing and other changes in form and details can be made therein without departing from the spirit and scope of the invention.

What is claimed is:

1. A rear body structure of a vehicle including a rear combination lamp whose lateral ends extend on side surfaces of the rear body structure, comprising rear fenders which are depressed forwardly with a depth corresponding to a distance that the lateral ends of the rear combination lamp extend on said side surfaces of the body structure, and a rear end panel being flush with depressed surfaces of said rear fenders to form a mounting surface for said rear combination lamp.

2. A rear body structure of a vehicle as set forth in claim 1, wherein under said rear end panel is provided a lower rear panel being flush with said rear end panel and between said rear end panel and said lower rear panel is arranged on end of a rear floor.

3. A rear body structure of a vehicle as set forth in claim 1, wherein below said rear combination lamp is arranged a sight shield and below thereof is arranged a rear bumper.

4. A rear body structure of a vehicle as set forth in claim 1, wherein lamps are provided in the lateral ends of the rear combination lamp extending on said side surfaces of the rear body structure.

5. A rear body structure of a vehicle as set forth in claim 1, wherein lamps are housed in said rear combination lamp so as not to extend beyond said rear end panel into a trunk.

* * * * *